United States Patent [19]

Spring et al.

[11] Patent Number: 4,901,085
[45] Date of Patent: Feb. 13, 1990

[54] DIVIDED LLBFN/HMPA TRANSMITTED ARCHITECTURE

[75] Inventors: Kerry W. Spring, Pointe Claire; Harry J. Moody, Montreal, both of Canada

[73] Assignee: Spar Aerospace Limited, Ontario, Canada

[21] Appl. No.: 248,190

[22] Filed: Sep. 23, 1988

[51] Int. Cl.[4] .............................................. H01Q 3/22
[52] U.S. Cl. .................................... 342/373; 342/368; 455/12
[58] Field of Search .................... 342/373, 368; 455/12

[56] References Cited

U.S. PATENT DOCUMENTS

| | | | |
|---|---|---|---|
| 4,414,550 | 11/1983 | Tresselt | 343/700 |
| 4,499,471 | 2/1985 | Luh | 342/373 |
| 4,633,259 | 12/1986 | Hrycak | 342/373 |
| 4,638,317 | 1/1987 | Evans | 342/373 |
| 4,652,379 | 3/1987 | Rudish et al. | 342/371 |
| 4,727,421 | 2/1988 | Koga | 358/133 |

OTHER PUBLICATIONS

Shunichiro Egami and Makoto Kawai, "An Adaptive Multiple Beam System Concept", May 1987, vol. SAC-4, No. 5, IEEE Journal On Selected Areas of Communications.

*Primary Examiner*—Thomas M. Tarcza
*Assistant Examiner*—David Cain
*Attorney, Agent, or Firm*—Fisher, Christen & Sabol

[57] ABSTRACT

A communications satellite uses a low level beam forming network connected to a hybrid matrix power amplifier section which has output ports connected to an array of radiating elements. Several beams emanate from the array and at least some of the elements are used in common for more than one beam to achieve beam overlap. The hybrid matrix power amplifier section which provides flexible power distribution, is formed of several relatively small hybrid matrix power amplifiers instead of a single relatively large one. This enables considerable advantages to be achieved, particularly dispensing with the requirement for port selection and reducing the size of the device, without compromising the performance.

3 Claims, 5 Drawing Sheets

DIVIDED LLBFN/HMPA TRANSMITTED ARCHITECTURE

BACKGROUND OF THE INVENTION

This invention relates to satellite communications and, more particularly, to an improved transmitter section of a communications satellite.

The current trend in communications satellite design is towards a multibeam antenna (MBA) design on the spacecraft to provide high antenna gain and frequency reuse capability. A problem with the MBA concept for focal point feed parabolic reflector antenna systems is the difficulty of moving power from one beam to another.

For multibeam antenna systems where each beam is formed by a single feed element, a Hybrid Matrix Power Amplifier (HMPA) can be used to allow power to be moved between beams (FIG. 1). However, for such antenna systems, the edge of beam gain is low due to the beam shape and the beam separation is determined by the physical size of the feed elements.

To provide high antenna gain and good beam overlap for a focal point feed parabolic reflector antenna system, beams may be formed from multiple feed elements. An example of such a system is described in copending U.S. patent application Ser. No. 197,328 filed on May 28, 1988 and assigned to the assignee of the present application. The disclosure of U.S. patent application Ser. No. 197,328 is hereby incorporated by reference. The system described in that application combines the capabilities of a low level beam forming network (LLBFN) with the hybrid matrix power amplifier (HMPA). The LLBFN allows efficient beam overlap using multiple element feed clusters where adjacent beams share feed elements. The HMPA allows the power for any feed element or set of feed elements to be distributed evenly among the individual power amplifiers providing flexible assignment of traffic between beams up to the limit of the spacecraft power resources.

SUMMARY OF THE INVENTION

The present invention relates to an improvement on the combination of the LLBFN and the HMPA through the inherent power division within the LLBFN. This improvement:
 (a) reduces the mass,
 (b) reduces the insertion loss,
 (c) increases the manufacturability, and
 (d) eases the layout of the combined LLBFN/HMPA system while otherwise maintaining equivalent power sharing performance.

According to the invention, the single HMPA used in the above-identified prior application is replaced with a plurality of smaller, preferably identical, HMPA's. Often, ideal results are achieved when the number of HMPA's is equal to the number of radiating elements used to form each beam but useful results can also be obtained when the number of HMPA's is greater or less than the number of radiating elements used to form each beam. The configuration of the feed array and the type of excitation of the elements of the feed array determine the number of HMPA's which are most appropriate.

DESCRIPTION OF THE PREFERRED EMBODIMENTS

Figure 1:
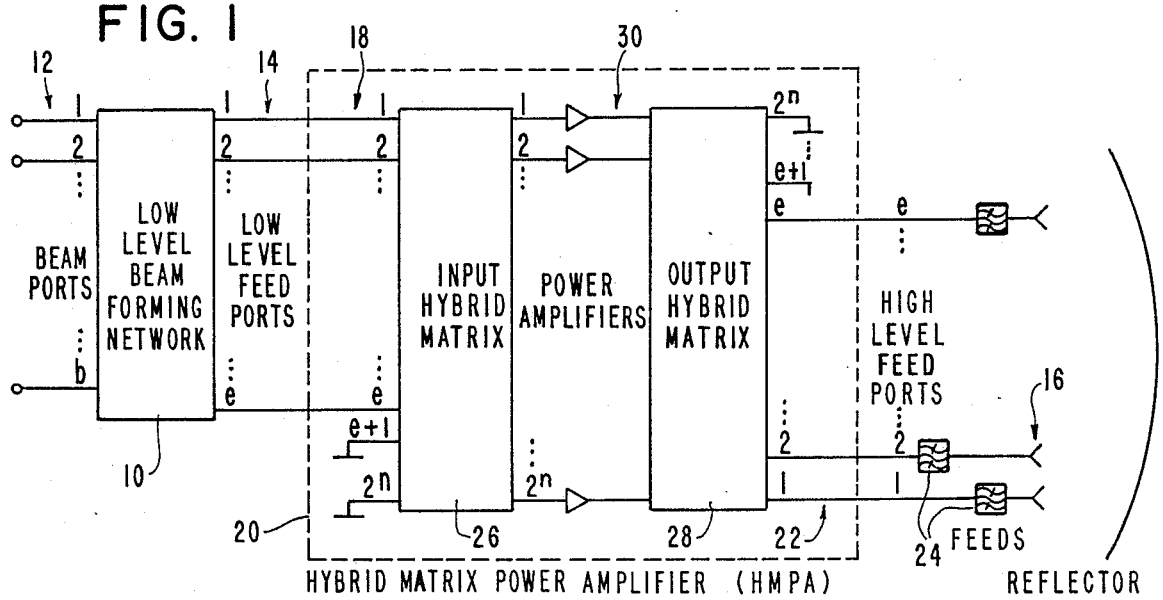
FIG. 1 illustrates schematically the system described in the above-identified prior application.
Figure 2:
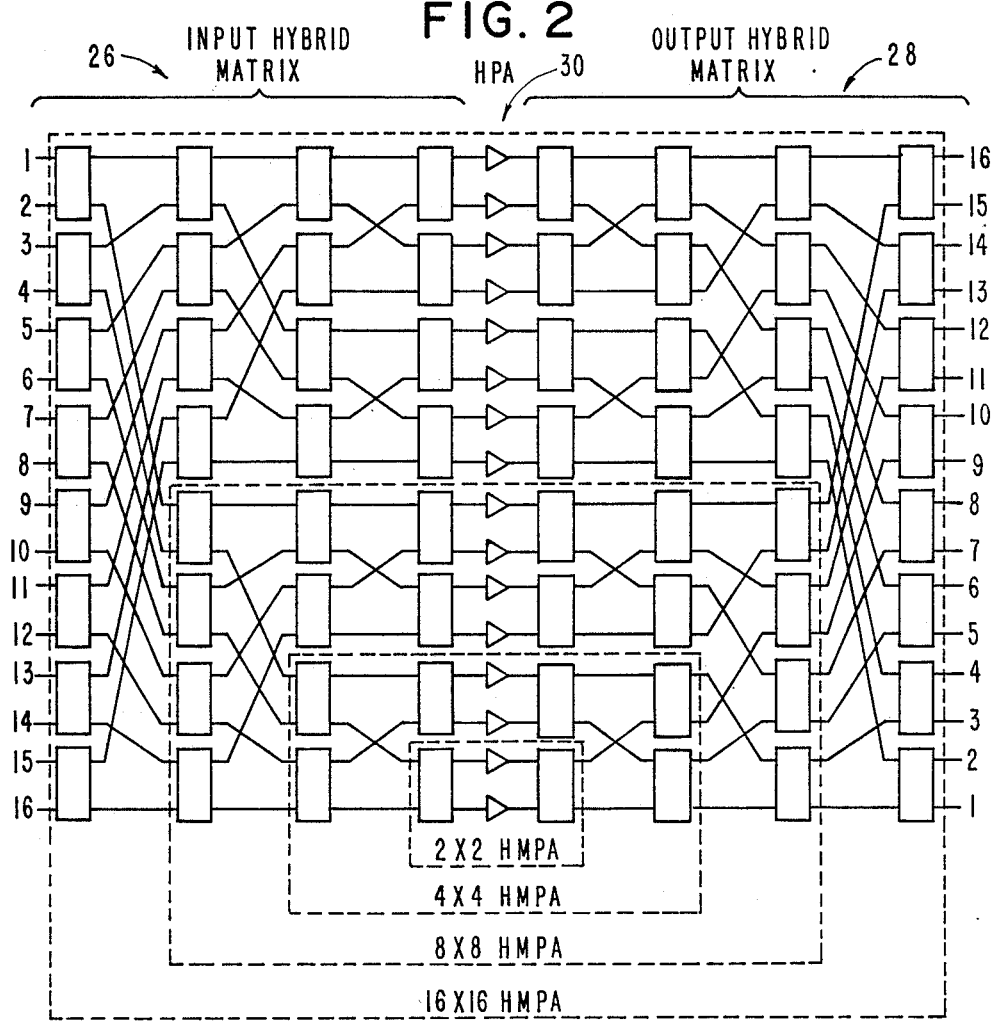
FIG. 2 illustrates schematically an HMPA with up to 16 input and 16 output ports, i.e., a 16x16 HMPA.

The system described in the above-identified prior application will firstly be described briefly with reference to FIGS. 1 and 2.

In FIG. 1, an LLBFN 10 has a plurality of input ports 12 equal in number to the number of beams and a plurality of output ports 14 equal in number to the number of radiating elements 16. The output ports are connected to respective input ports 18 of an HMPA 20 the corresponding output ports 22 of which are connected respectively to the radiating elements 16 via filter circuits 24.

The HMPA 20 consists of a $2^n \times 2^n$ low power input hybrid matrix 26, a $2^n \times 2^n$ high power output hybrid matrix 28, and a full complement of $2^n$ individual power amplifiers 30 in between. Details of an HMPA with up to 16 ports HMPA are shown in FIG. 2. There is a one to one correspondence between the input and output ports of the HMPA so that a signal applied to a single input port (i.e., the $i^{th}$ input port) appears in amplified form at a single output port (i.e., the $i^{th}$ output port). The signal levels at the respective inputs to all of the individual amplifiers are equal so that all of the amplifiers are driven at the same level. Some of the output ports may be terminated, if required, provided the corresponding input ports are also terminated. All amplifiers, however, must be present so that the required number of amplifiers is between one and two times the total number of feed elements.

There are several problems with this combined LLBFN/HMPA architecture.

(a) HMPA Port Selection

The formation of beams by multiple element feeds requires that the LLBFN apply coherent signals to multiple input ports of the HMPA. The HMPA ports used to form each individual beam, therefore, must be selected so that the resulting power distribution arising from that beam is uniform or near uniform among the individual amplifiers. The difficulty in obtaining at least a near uniform power distribution increases with the number of beams and the number of feed elements forming each beam. How this is achieved is discussed in the above-identified prior application.

(b) HMPA Accommodation and Layout

A large HMPA is not easily accommodated on a spacecraft. Large spacecraft typically have two separated thermal radiating faces (i.e., the north and south faces for a geosynchronous spacecraft). Payload high power equipment is divided more or less equally between these two faces. For a payload dominated by a single transmit antenna, it would be required to mount half the amplifiers on each of the thermal radiating faces, thereby complicating the layout of the high power output matrix.

The single HMPA has the ability to apply all of the power to a single radiating element while distributing the power equally among all of the amplifiers. This capability is not required when each beam is formed by means of a cluster of feed elements.

Figure 3:
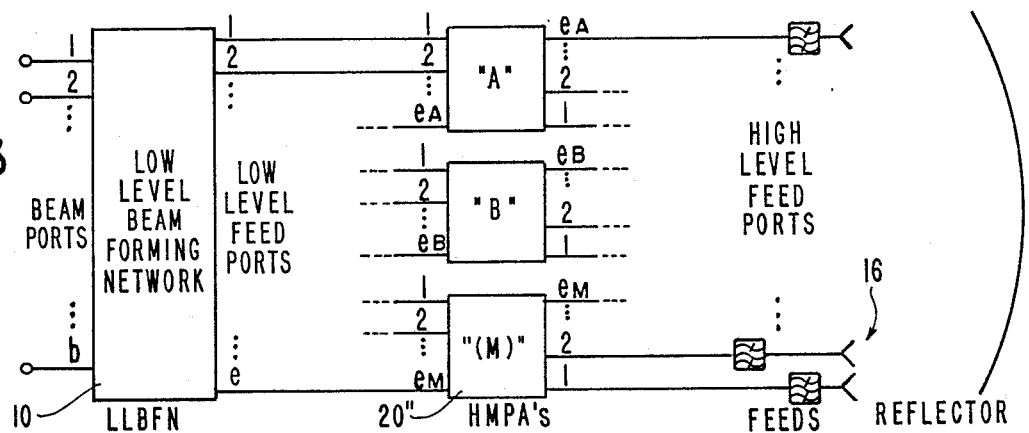
FIG. 3 illustrates schematically the general concept of the present invention.

The HMPA is required at most to apply all of the power to a single beam while distributing the power from that single beam equally or near equally among the amplifiers. With this more appropriate requirement, the HMPA may be subdivided into a number of smaller HMPA's 20' (see FIG. 3). These smaller HMPA's require fewer levels of hybrids and thus will have a lower total mass as well as lower insertion loss. The approach also allows more flexibility in choice of total number of amplifiers ($m.2^n$ rather than $2^n$) so that, if fewer amplifiers are employed, a potential mass saving results.

The basis for this subdivision lies in the inherent division of power in the LLBFN between the multiple elements forming each beam and, for the non ideal case, in the statistical distribution of power among the beams. If the LLBFN divides the power equally between each of the smaller HMPA's, then there is a uniform distribution of power among the amplifiers no matter how power is assigned to the beams. This occurs, for example, when the number of smaller HMPA's is equal to the number of elements used to form each beam and there is uniform excitation of the elements for each beam. Even if the LLBFN does not divide the power for each individual beam, however, random distribution of power between the beams will dictate near equal power among the amplifiers.

If the number of HMPA's is less than the number of elements used to form each beam, then at least one HMPA must be used to drive two or more elements forming the beam. In this case, the HMPA ports used to drive these two or more elements (as well as similar elements of other beams) must be selected so that the resulting power distribution arising from that beam is uniform or near uniform among the individual amplifiers of that HMPA. This, however, is a much simpler task than the selection of ports for a large single HMPA.

Examples of LLBFN/HMPA concepts for three antenna configurations are discussed below. For each of these, it is possible to employ different numbers of HMPA's each with particular advantages.

A 4×3 ELEMENT RECTANGULAR FEED ANTENNA

Figure 4:
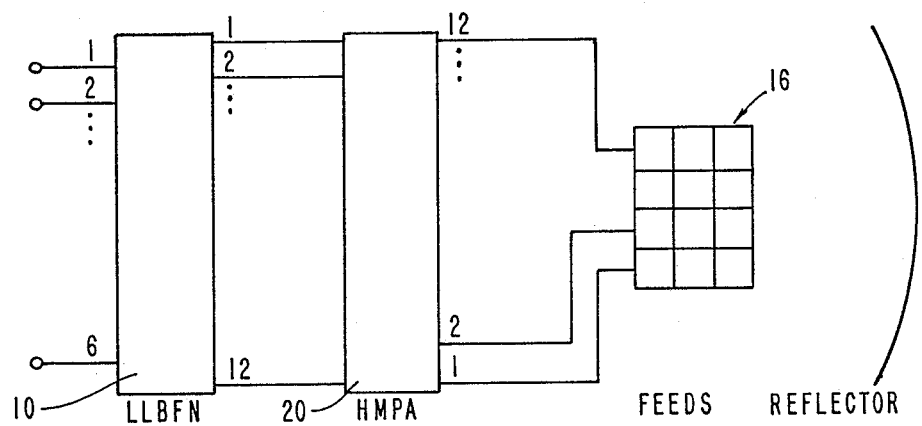
FIGS. 4a, b and c illustrate schematically the present invention as applied to a 4×3 rectangular feed antenna, with FIG. 4a showing the case where a single HMPA is used, FIG. 4b showing the case where three HMPA's are used and FIG. 4c showing the case where four HMPA's are used.
Figure 4:
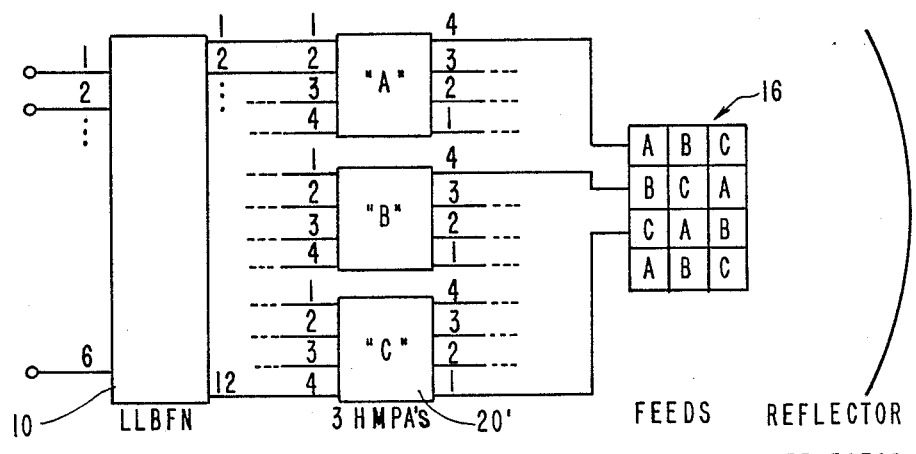
Figure 4:
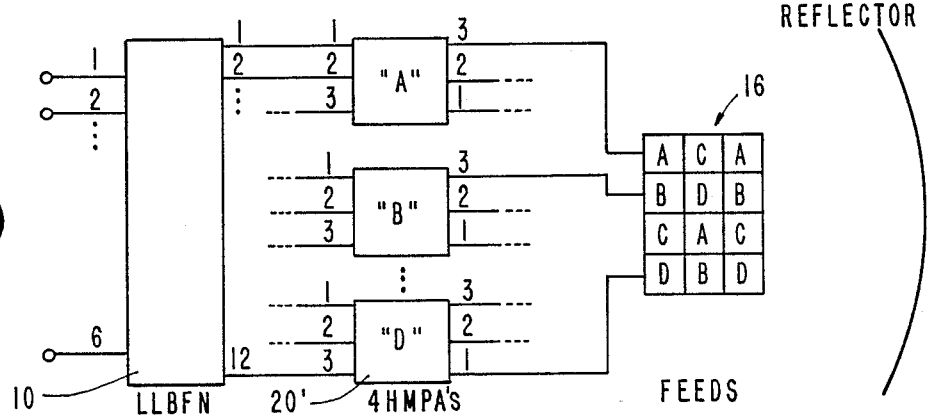

For a simple 4×3 element rectangular feed antenna where there are six beams and each beam is formed by four elements, possible HMPA divisions are given in Table 1 and some of these are illustrated in FIGS. 4a, b and c. In FIGS. 4b and 4c each HMPA is designated by a letter "A", "B", "C" and, in the case of FIG. 4c, "D" and the radiating elements are also designated A, B, C and (for FIG. 4c) D. The radiating elements A are fed by HMPA "A", radiating elements B fed by HMPA "B" and so on. The use of four HMPA's (FIG. 4c) provides equivalent performance to the use of a single HMPA (FIG. 4a) but requires fewer hybrids and eliminates the problem of HMPA port selection. The use of two HMPA's has similar though less substantial advantages. There is a requirement for 16 amplifiers for all three of these systems and each would accommodate a 4×4 element rectangular feed with no change in HMPA hardware.

The use of three HMPA's (FIG. 4b) reduces the number of amplifiers to just 12. However, since the number of HMPA's is less than the number of elements per beam, for each beam one of the HMPA's must drive two elements. This implies selection of HMPA ports to maximize the uniformity of amplifier power loading. With uniform excitation of the four elements forming each beam there will not be uniform amplifier loading for the individual beam. This antenna has only six beams so that random assignment of power between the beams will not provide a high probability of near equal amplifier loading.

TABLE 1

| HMPA's | | Port Sel. | Amplifiers | | FIG. No. | Notes |
|---|---|---|---|---|---|---|
| No. | Size | | No. | Uniform Load | | |
| 0 | | N/A | 12 | No | | Only marginal power sharing. |
| 1 | 16 × 16 | 4 | 16 | Yes | 4a | Port selection difficult. |
| 2 | 8 × 8 | 2 | 16 | Yes | | Uniform with equal excitation |
| 3 | 4 × 4 | 2 | 12 | Possible | 4b | Uniform if excitation skewed. Statistics do not help. |
| 4 | 4 × 4 | none | 16 | Yes | 4c | Uniform with equal excitation |
| 8 | 2 × 2 | none | 16 | No | | Some improvement over no HMPA. |

Concepts for a 4 by 3 Rectangular Feed Antenna (4 elements per beam, 6 beams)

The use of eight HMPA's, each only 2×2, provides only a small degree of power sharing among beams and thus is of limited interest.

For this antenna configuration, the use of four HMPA's would appear to be the better choice unless ment of power between the beams will provide a high probability of near equal amplifier loading.

TABLE 2

Concepts for a 9 by 8 Feed Antenna
(9 elements per beam, 56 beams)

| HMPA's | | Port | Amplifiers | | FIG. | |
|---|---|---|---|---|---|---|
| No. | Size | Sel. | No. | Uniform Load | No. | Notes |
| 0 | | N/A | 72 | No | | Only marginal power sharing. |
| 1 | 128 × 128 | 9 | 128 | Yes | 5a | Port selection difficult. |
| 3 | 32 × 32 | 3 | 96 | Near | | Port selection manageable. |
| 5 | 16 × 16 | 2 | 80 | Near | 5b | Uniform is excitation skewed. |
| 8 | 16 × 16 | 2 | 128 | Near | 5c | |
| 4 | 32 × 32 | 3 | 128 | Near | | Port selection manageable |
| 2 | 64 × 64 | 5 | 128 | Near | | Port selection difficult. |
| 9 | 8 × 8 | none | 72 | Yes | 5d | Uniform if equal excitation |
| 10 | 8 × 8 | none | 80 | Near | | | there were some special circumstances implicating the use of only three HMPA's. This may include:

(i) Skewed distribution of power to elements forming each beam allows equal loading of the amplifiers (i.e., half the power to the two elements formed be a single HMPA.)

(ii) The amplifiers for the three HMPA system, including the reserve power capacity to accommodate expected non-uniform loading, provide a net mass saving over the four HMPA system.

A 9×8 ELEMENT RECTAGULAR FEED ANTENNA

Figure 5A:
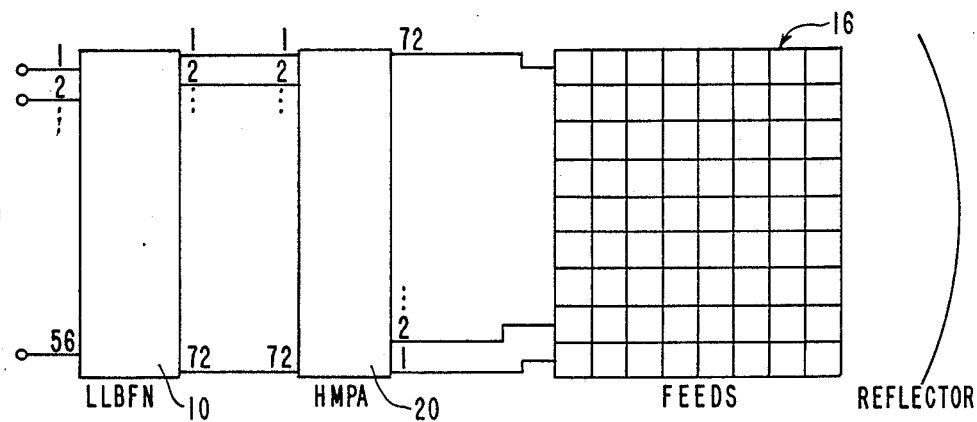
FIGS. 5a, b, c and d illustrate schematically the present invention as applied to a 9×8 rectangular feed antenna, with FIG. 5a showing the case where a single HMPA is used, FIG. 5b showing the case where five HMPA's are used, FIG. 5c showing the case where eight HMPA's are used and FIG. 5d showing the case where nine HMPA's are used.
Figure 5B:
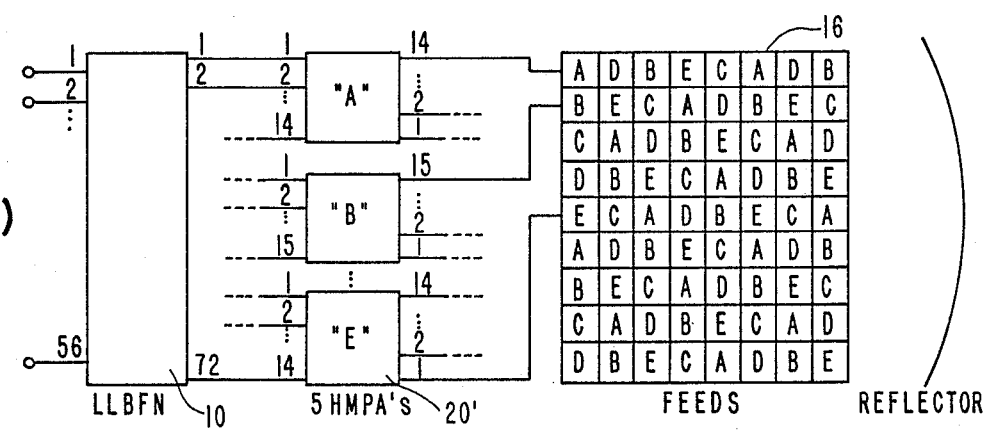
Figure 5C:
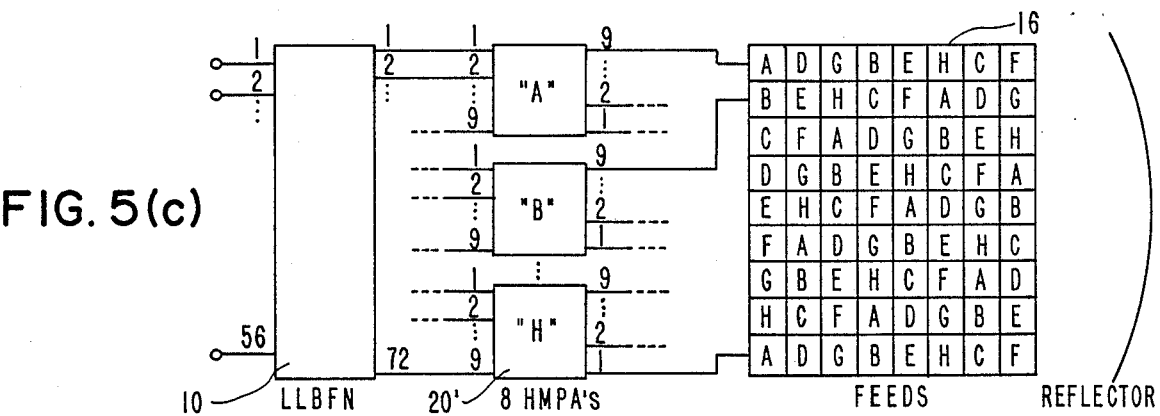

For a more complex 9×8 element rectangular feed antenna where there are fifty six beams and each beam is formed by nine elements, several possible HMPA divisions are given in Table 2. The use of eight HMPA's (FIG. 5c) provides equal performance to the use of a single HMPA (FIG. 5a) but requires fewer hybrids and minimizes the problem of HMPA port selection. The use of two of four HMPA's has similar though less substantial advantages. There is a requirement for 128 amplifiers for all of these systems and each would accommodate a 16×8 element rectangular feed with no change in HMPA hardware.

The use of five HMPA's (FIG. 5b) reduces the number of amplifiers to just 80. However, since the number of HMPA's is less than the number of elements per beam, each HMPA must drive two elements for a number of beams. This implies selection of HMPA ports to maximize the uniformity of amplifier loading. Again, unless the power distribution between the nine elements forming each beam is skewed, there will not be equal amplifier loading for each beam. The use of 10 HMPA's also reduces the number of amplifiers to just 80 and avoids the requirement for selection of HMPA beam ports while providing near uniform amplifier loading. Even with non-uniform amplifier loading for each beam, since this antenna has 56 beams, random assignment of power between the beams will provide a high probability of near equal amplifier loading.

Figure 5D:
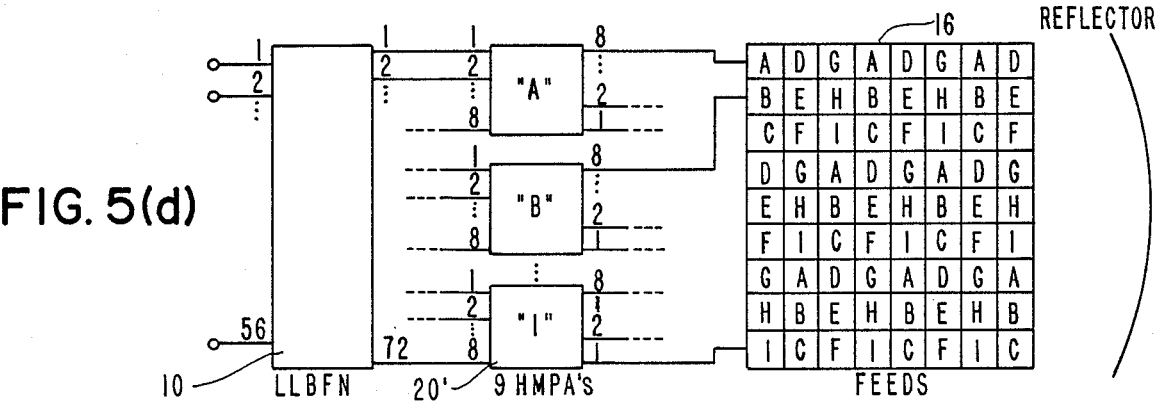

If nine HMPA's are employed FIG. 5d), only 72 amplifiers are required. For equal weighting to each of the nine elements forming individual beams, amplifier loading will be uniform without the need for HMPA port selection. For a 9×8 element feed antenna, the nine HMPA system is a clear favourite.

For a smaller 8×8 element feed antenna, where only 64 amplifiers would be required if eight HMPA's were employed, there may still be an advantage to employing nine HMPA's since this configuration avoids the requirement for port selection.

A 91 ELEMENT HEXAGONAL FEED ANTENNA

Figure 6A:
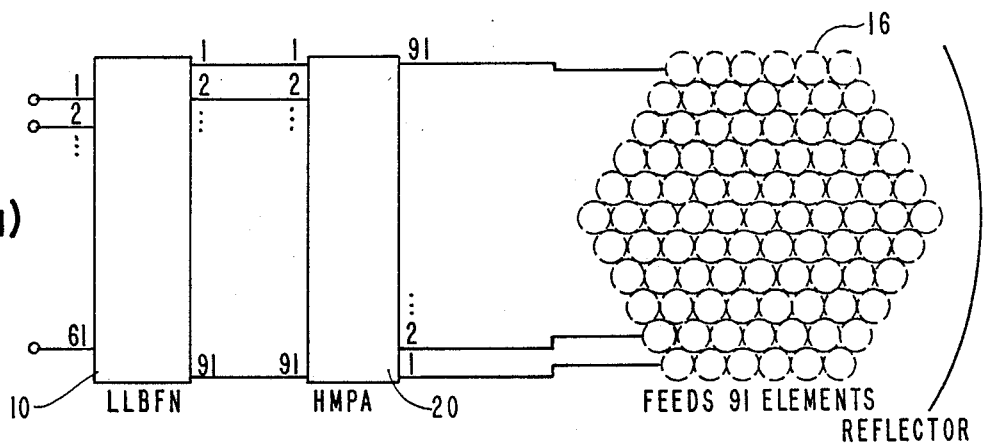
FIGS. 6a, b, c and d illustrate schematically the present invention as applied to a 91 element hexagonal feed antenna, with FIG. 6a showing the case where a single HMPA is used, FIG. 6b showing the case where four HMPA's are used, FIG. 6c showing the case where six HMPA's are used and FIG. 6d showing the case where seven HMPA's are used.
Figure 6B:
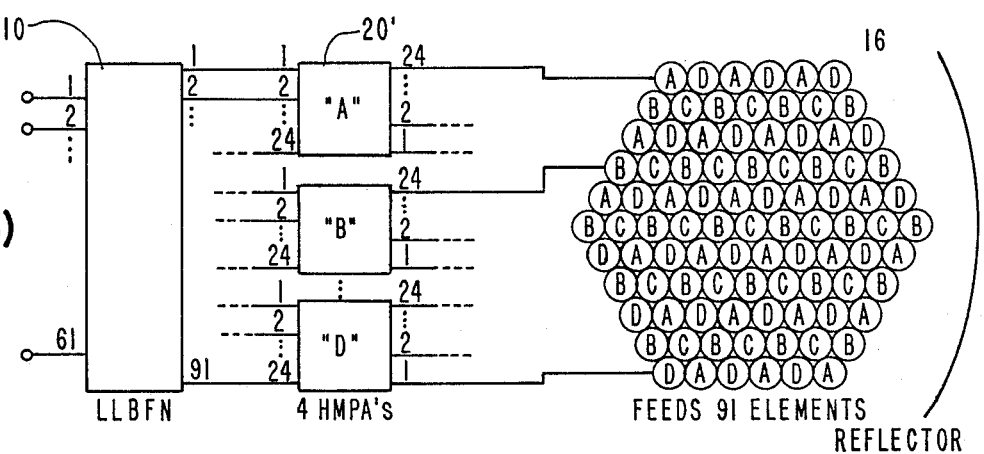

For a more complex 91 element hexagonal feed antenna where there are sixty one beams and each beam is formed by seven elements, a number of possible HMPA divisions are given in Table 3. The use of eight HMPA's would provide the same performance as the use of a single HMPA (FIG. 6a) but would require fewer hybrids and would also minimize the problem of HMPA port selection. The use of two or four HMPA's (FIG. 6b) has similar though less substantial advantages except that HMPA ports must still be selected. There is a requirement for 128 amplifiers for all of these systems and each would accommodate a 127 element hexagonal feed antenna with no change in HMPA hardware.

Figure 6C:
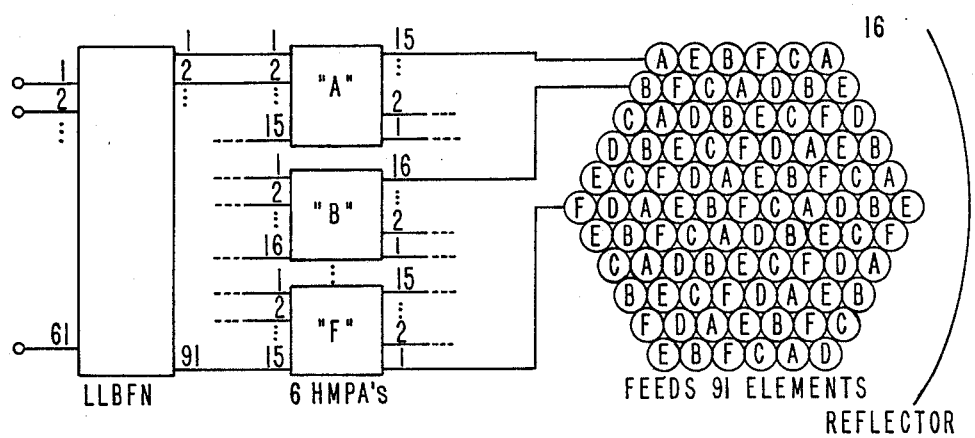

The use of six HMPA's (FIG. 6c) reduces the number of amplifiers to just 96. However, since the number of HMPA's is less than the number of elements per beam, one HMPA must drive two elements for each beam. This implies selection of HMPA ports and, unless the power distribution between the nine elements forming each beam is skewed, there will not be equal sharing of power among the amplifiers. However, this antenna has 61 beams so that random assignment of power between the beams will provide a high probability of near equal amplifiers loading.

TABLE 3

Concepts for a 91 Element Hexagonal Feed Antenna
(7 Elements per beam, 61 beams)

| HMPA's | | Port | Amplifiers | | FIG. | |
|---|---|---|---|---|---|---|
| No. | Size | Sel. | No. | Uniform Load | No. | Notes |
| 0 |  | N/A | 72 | No |  | Only marginal power sharing. |
| 1 | 128 × 128 | 7 | 128 | Yes | 6a | Port Selection Difficult. |
| 2 | 64 × 64 | 4 | 128 | Near |  | Port Selection Difficult. |
| 4 | 32 × 32 | 2 | 128 | Near | 6b | Uniform if excitation skewed. |
| 6 | 16 × 16 | 2 | 96 | Near | 6c | statistics make uniform |
| 3 | 32 × 32 | 3 | 96 | Near |  |  |
| 7 | 16 × 16 | none | 112 | Yes | 6d | Uniform if excitation equal |
| 8 | 16 × 16 | none | 128 | Near |  |  |

Figure 6D:
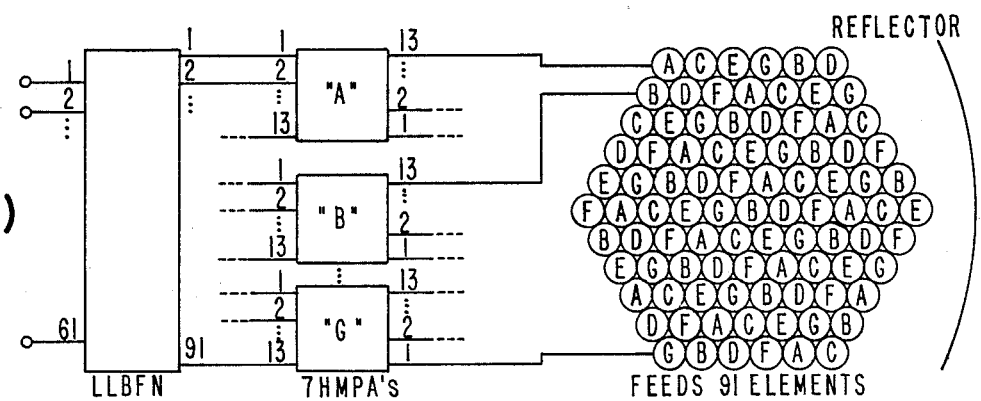

If seven HMPA's are employed (FIG. 6d), then 112 amplifiers are required. For uniform weighting to each of the seven elements forming individual beams, amplifier loading will be uniform without the need for HMPA beam ports selection. For a 91 element antenna, the six and seven HMPA systems are the clear favourites. The seven HMPA system is simpler and provides uniform amplifier loading while the six HMPA system, which employs fewer amplifiers, will not necessarily provide totally uniform amplifier loading and requires HMPA port selection.

In all the different antenna arrangements described above where there are fewer HMPA's than number of elements per beam, port selection is involved. The actual process of port selection to obtain uniform or near uniform amplifier loading is explained in above mentioned United States patent application Serial No. 197,328.

In order to choose the exact connectivity it is necessary to know the horn illumination for each beam. This is always different for each different antenna design.

In order to choose the exact connectivity it is necessary to know the horn illumination for each beam. This is always different for each different antenna design.

As a general rule, the best option is to have the same number of HMPA's as there are feed elements used to form a beam so as to avoid the requirement for port selection. For this best option, if the beam power is equally divided among the feed elements in a cluster, then the power division among the amplifiers is exact. This is not generally the case and so equal power division is more a matter of statistical averaging among the HMPA along with a judicious selection of ports.

Figure 7:
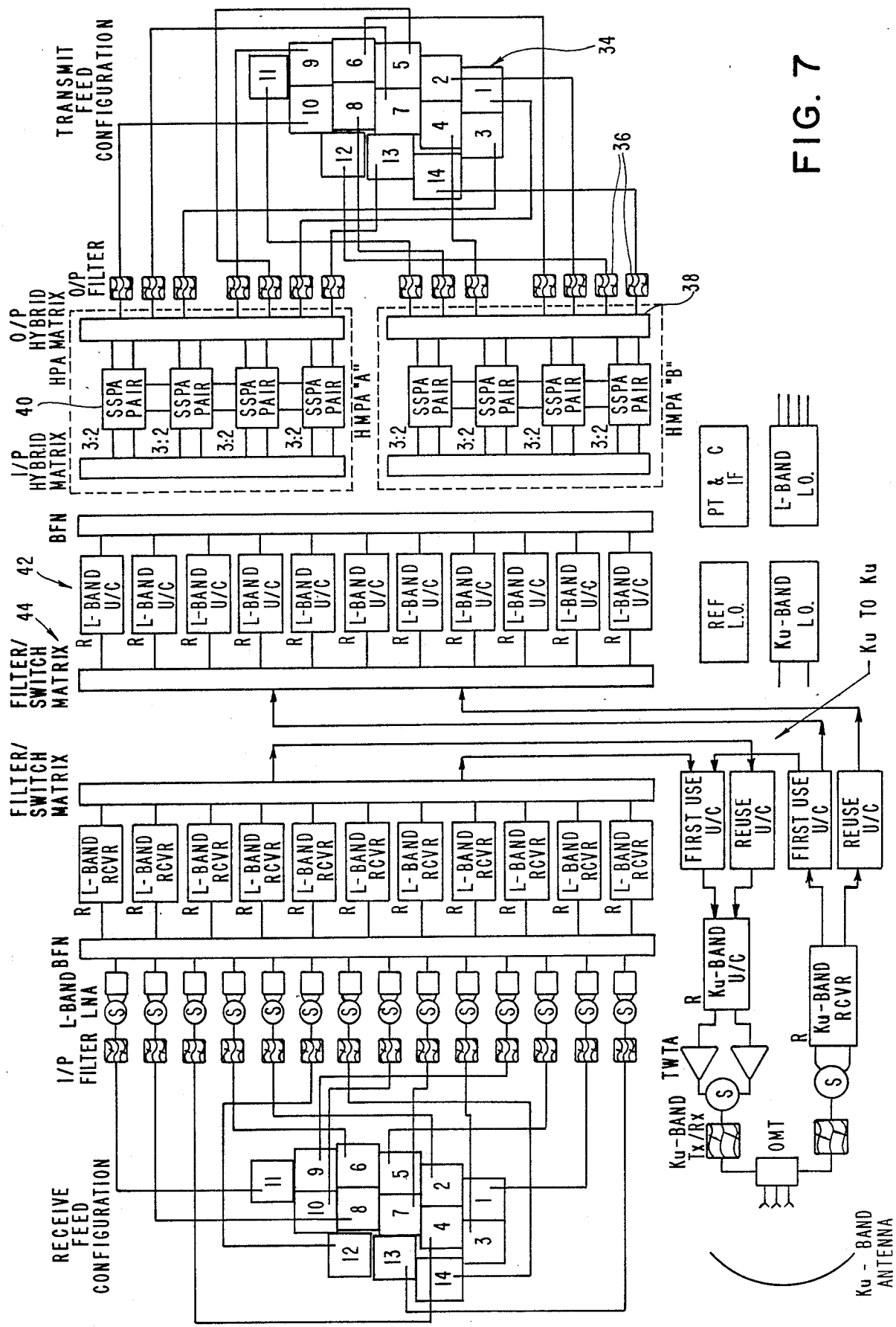
FIG. 7 illustrates schematically one practical embodiment of the invention using 14 antenna horns.

Referring now to FIG. 7, this illustrates the invention as applied to an MSAT L-band transmitter. The left hand side of the figure is the RECEIVE side which is conventional and will not be described hereinafter. The right hand side is the TRANSMIT side and includes an antenna array of fourteen horns 34. Each horn 34 is connected through an output filter 36 to a respective output port 38 of two 8×8 HMPA's reference HMPA "A" and HMPA "B", with one output port of each HMPA being terminated.

The amplifiers 40 within the HMPA's are solid state power amplifiers (SSPA) grouped in pairs with a 3 for 2 redundancy plus cross-strapping between pairs.

Beams are formed using three or four horns per beam. For example, one beam is formed by horn numbers 9, 10 and 11 whereas another beam is formed by horn numbers 6, 8, 9 and 10. Because there are more horns per beam than there are HMPA's, the HMPA ports used for each horn must be carefully selected to provide uniform (or near uniform) amplifier loading for each beam within each HMPA.

Power for each beam need not be distributed uniformly among the 3 or 4 horns nor necessarily between the two HMPA's. This means that for a number of the beams the amplifiers will not be uniformly loaded. However, for all of these beams the amplifier loading is reasonably even. Distribution of traffic between the beams will result in near uniform loading.

The LLBFN 42 and FILTER/SWITCH MATRIX 44 are conventional and will not, therefore, be described further.

GENERAL SUBDIVISION OF THE HMPA

The above example antenna systems were chosen to emphasize the advantages of subdividing the HMPA. Other antenna configurations may not allow the same magnitude reduction in the number of amplifiers required.

Generally, HMPA subdividion can provide equivalent power sharing performance compared to the use of a single large HMPA. Subdivision also reduces the number of hybrid levels thus decreasing the mass while also reducing the insertion of loss. In many instances it can also reduce the number of amplifiers and thus again reduce the mass. Most importantly, however, HMPA subdivision:

(a) Reduces the size of the individual HMPA making it easier to manufacture, and (b) Permits the amplifiers to be mounted on more than one thermal radiating panel without introducing high power signal connections between panels.

Both of these advantages contribute to the feasibility of implementing a focal point feed parabolic reflector antenna system with complete power agility between beams.

RANGE OF APPLICATIONS

Although the above concept was inspired by the need for power agility between the transmit beams of a spacecraft transponder and has been described as a spacecraft system, it can be used to support a variety of applications which share some or all of the following requirements:

(a) High antenna gain over a wide area which is achievable only with a number of spot beams.

(b) Continuous coverage so that cross-over gain between spot beams must be maximized (i.e., multiple element beams).

(c) The capability to provide flexibility in the assignment of power among the beams without significant loss or compromise in power efficiency (i.e., requires power agility between beams).

(d) A large amount of power so the power efficiency is critical.

(e) Operated with multicarrier signals in a common power amplifier.

(f) Equipment configuration/layout constraints impose the separation of high power equipment onto two or more panels.

Some or all of these requirements may apply for example on particular ground based, ship based, or aircraft based systems.

Modifications of the embodiments described above will occur to those skilled in the art and should be considered to fall within the scope of the appended claims. For example, although in the above described embodiments all of the HMPA's used in a particular case are of the same size, the inventive concept is not to be limited to such an arrangement. The desire or necessity to create as uniform as possible an amplifier loading naturally leads to choosing identical HMPA's. However, doubtless there will arise odd situations where a choice of non-identical hMPA's provides a more optional spreading of power among individual amplifiers.

Alternatively, it may be advantageous to use different sizes of HMPA's in order to reduce the number of amplifiers despite uneven loading. For instance, a system with 60 feed elements could be driven by seven $8 \times 8$ and one $4 \times 4$ HMPA's.

What we claim as our invention is:

1. In an overlapping beam, power versatile system for a communications transmitter comprising a low level beam forming network having inputs to which a plurality of individual beam signals are respectively applied, the low level beam forming network having a plurality of outputs, some of which respectively carry the sum of components of more than one input signal, a hybrid matrix power amplifier means having input ports respectively connected to the outputs of the low level beam forming network and having complementary output ports respectively connected to a plurality of radiating elements of the same number as the outputs of the beam forming network, whereby a plurality of beams each emanating from more than one of the radiating elements can be achieved, some of the radiating elements being used in common for more than one beam to achieve beam overlap, the improvement where the hybrid matrix power amplifier means is formed as a plurality of separate hybrid matrix power amplifiers.

2. A system according to claim 1, wherein the hybrid matrix power amplifiers are identical.

3. A system according to claim 2, wherein the number of hybrid matrix power amplifiers is the same as the number of radiating elements used for each beam, whereby no port selection of the hybrid matrix power amplifiers is needed for uniform distribution of power.

* * * * *